United States Patent [19]
Dejouhanet et al.

[11] 3,975,773
[45] Aug. 17, 1976

[54] THIN FILM MAGNETIC HEADS

[75] Inventors: Jean-Pierre Dejouhanet, Paris; Jean-Pierre Lazzari, Montfort l'Amaury, both of France

[73] Assignee: Compagnie Internationale pour l'Infomatique, Louveciennes, France

[22] Filed: Mar. 10, 1975

[21] Appl. No.: 557,036

[30] Foreign Application Priority Data
Mar. 11, 1974 France .......................... 74.08180

[52] U.S. Cl. ........................... 360/126; 360/121; 360/127
[51] Int. Cl.² ..................... G11B 5/16; G11B 5/27; G11B 5/14
[58] Field of Search .......... 360/126, 123, 121, 127, 360/122

[56] References Cited
UNITED STATES PATENTS
3,867,368  2/1975  Lazzari .............................. 360/126

*Primary Examiner*—Robert S. Tupper
*Attorney, Agent, or Firm*—Kemon, Palmer & Estabrook

[57] ABSTRACT

In a thin film magnetic writing head structure, a high permeability layer is arranged parallel to the lateral face of a pole piece which is situated in the downstream direction of movement of the magnetic record carrier under the head airgap. Said high permeability layer is magnetostatically de-coupled from the pole piece. This arrangement guides the zero magnetic field lines from the head along the frontal plane of the pole piece and along the lateral face of said piece, thereby drastically reducing the action of de-magnetizing components of the writing flux on the record.

8 Claims, 5 Drawing Figures

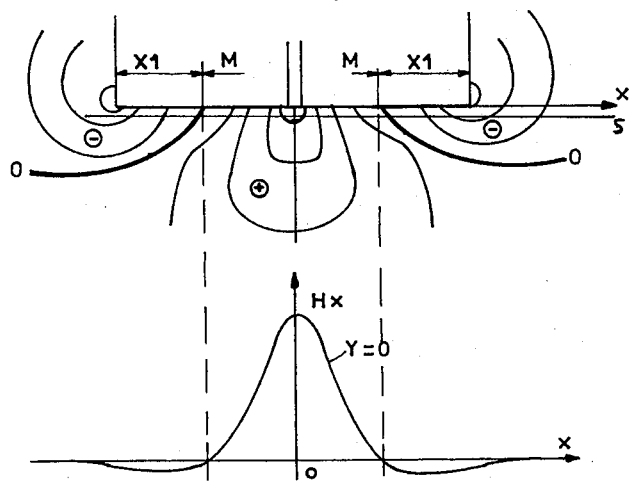
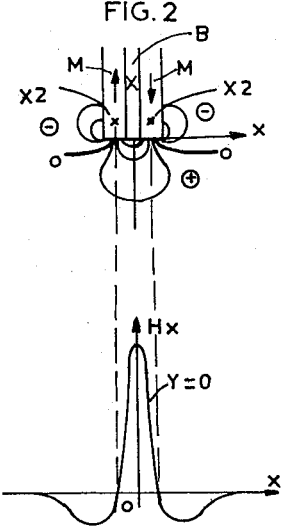
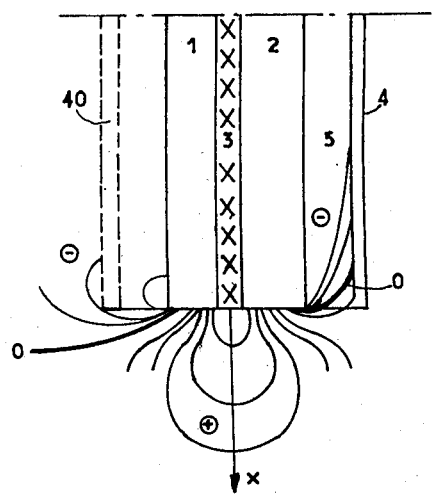
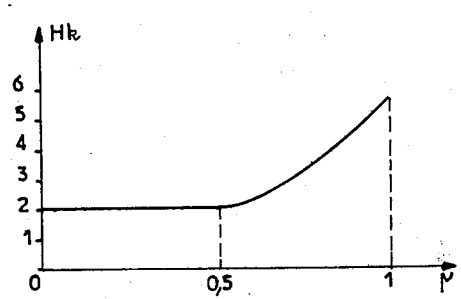
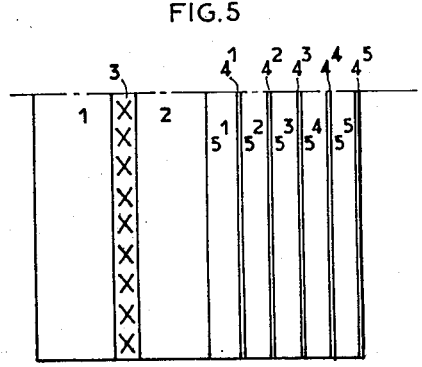

THIN FILM MAGNETIC HEADS

SUMMARY OF THE INVENTION

The present invention concerns improvements in or relating to thin film magnetic head structures for writing digital and analog information on a magnetic recording medium.

A typical thickness of the airgap of any embodiment of writing heads is of the order of a few microns. The thickness of a pole piece of a conventional head is of one order of the millimeter. The thickness of a pole piece of a thin film head is, on the other hand, of the order of a few microns, i.e. of the same order of value as the thickness of the airgap proper. In a conventional head, further, the orientation of the magnetization is parallel to the frontal plane whereas said orientation is perpendicular to this plane in a thin film or "integrated" head.

Thin film magnetic heads suffer more from a drawback which exists in both conventional and integrated heads, but may be considered unimportant in the conventional structures: reference is made to FIGS. 1 and 2 of the accompanying drawings. FIG. 1 concerns a conventional head. FIG. 2 concerns a thin film head. Each figure shows the spatial distribution of the magnetic field lines emanating from the head during a writing operation and a corresponding curve of the variation of the value and gradient of said field along an X-axis located in the frontal plane and oriented in the direction of movement of the magnetic record carrier under said frontal plane.

It can be seen that the "field chart" or plot of the field which is generated by the head for writing information on the recording medium comprises a field zone, arbitrarily marked +, meaning "positive" delineated within two zero field lines, marked 0, and two further zones, each arbitrarily marked —, meaning "negative," on either side of the zero field lines and external to the "positive" field zone. The "positive" field zone is oriented outwardly of the head towards the carrier S, FIG. 1, which must pass therethrough for recording. The field lines are distributed symmetrically with respect to an axis Y perpendicular to the frontal plane of the head structure and in the mid-plane of its airgap. When projected on an axis X oriented in said frontal plane, the variations of value of these field lines give the curves Hx plotted against the abscissae X in said FIGS. 1 and 2. It may be appreciated that, in both curves, the positive values of Hx are substantially the same but the negative values of Hx are definitely higher for the curve of FIG. 2, concerning an integrated head than for the curve of FIG. 1, concerning the conventional head structure. This is mainly due to the fact that the magnetization vectors M are relatively parallel to the frontal plane in a conventional structure whereas said vectors are perpendicularly oriented to said frontal plane in an integrated head structure and further to the fact that the distance X1 between the edge of a pole piece to the place within the pole piece from which emanates the zero field lines, FIG. 1, is much greater than the distance X2, corresponding to X1 in an integrated head, FIG. 2.

Whereas the magnetic fields generated within the "positive" zone are useful to saturate the medium of the record, the "negative" field components outside the zero field lines 0 may, when they reach the said medium, produce a de-magnetization which deteriorates the record which has just been produced by the said saturation. This drawback is unimportant in the conventional heads because the value and gradient of such de-magnetizing fields are rather small with respect to the saturating fields. On the other hand, said drawback is a major factor in the intergrated heads because the value and gradient of the de-magnetizing fields approach more closely the values of the saturating fields.

It is the purpose of the invention to provide a structure of a thin film "integrated" magnetic head which so modifies the writing field distribution that the values and gradients along X of the field components external to the zero field lines are drastically reduced and their action is practically nullified on the recording medium in the direction of movement of the record carrier under the frontal plane of the head, in at least that part of the writing field which is downstream with respect to the said movement.

According to the invention, such an object is obtained by so providing a thin film magnetic head structure that at least the zero flux lines, which are downstream of the head in the relative direction of movement of the record under the head, pass along the frontal plane of the corresponding pole piece and thereafter go upwardly the lateral face of said pole piece.

According to a feature of the invention, this condition is satisfied by providing a high permeability layer which is parallel to the lateral face of said pole piece and magnetically de-coupled therefrom, so that the unwanted and de-magnetizing field lines are "repelled" outside the space in which the magnetic record carrier moves.

As indicated at B in FIG. 2, the winding of a thin film magnetic head is located within the airgap created between the pole pieces. The magnetization of the high permeability layer may consequently be disturbed by the writing current passing through said winding. According to a further feature of the invention, this is avoided either by providing a shield layer between the pole piece and the high permeability layer or, preferably, by using a high permeability layer as a shield which is made of several elementary layers each of a restricted thickness and each magnetostatically de-coupled from the next one in their stack; while preserving an overall thickness of high permeability magnetic material capable of diverting the whole of the said unwanted magnetic flux lines.

BRIEF DESCRIPTION OF THE DRAWINGS

The invention will now be more fully described with reference to the figures of the accompanying drawings, in which:

FIG. 1 is a schematic view of a conventional magnetic recording head;

FIG. 2 is a similar view of a thin film head;

FIG. 3 is a schematic side view of a magnetic thin film head according to the invention, FIG. 4, shows a curve to facilitate the explanation of operation of the structure of FIG. 3, and, FIG. 5 shows a modification of the structure of FIG. 3.

The embodiments of FIGS. 3 and 5 are intended to be illustrative rather than limitative of the possibilities of reduction to practice of the invention.

DETAILED DESCRIPTION

In FIG. 3, the thin film magnetic head structure comprises two pole pieces 1 and 2 formed of a magnetic material such as permalloy, and defining between them an airgap within which a flat conductor winding 3 is inserted. The complete structure may be made according to a well-known technology, i.e. successive depositions of the thin films constituting the first pole piece 1, the various insulating and conductive layers forming the spiral or helix coil winding 3 and the second pole piece 2, starting from a substrate which is not shown. Reference may be made in this respect to U.S. Pat. No. 3,846,842 dated Nov. 5, 1974 in the name of Jean-Pierre LAZZARI and assigned to the same Applicant as the present application. Each of the pole pieces 1 and 2 may have a thickness of the order of 5 microns and the thickness of the airgap, i.e. its length in the direction of movement of the carrier of the record, may be from 3 to 4 microns.

When a writing current passes through the winding 3, the pole pieces are saturated except near their ends where their magnetization is disturbed by the presence of the de-magnitizing fields. In this part of the head, the magnetic charges are important and their distribution defines the above described field charts. The recording medium carrier must move through the field zone marked + but, in order to avoid the risk of demagnetization after having passed therethrough, the medium must not pass through the downstream zone marked —.

In a structure according to the invention, a high permeability layer 4 is added during the manufacturing of the head on the side of the pole piece 2, which will be the pole piece which is downstream with respect to movement of the record carrier when the head is used. The layer 4 is spaced from the pole piece 2 by a non magnetic layer 5, the thickness of which is such that its ensures a magnetic de-coupling between the layers 2 and 4 so that said layer 4 will divert the field lines — and consequently bring the zero field lines in the frontal plane of the head along the pole piece 2.

Since the pole piece layers 1 and 2 are of a high permeability material, the layer 4 may be made of the same material as the pole pieces. However the thickness of the layer 4 is such that its field of anisotropy Hk is the lowest possible with respect to the field of anisotropy of the layers 1 and 2 forming the pole pieces. When the layers are formed by thermal evaporation under vacuum, which process is a specially advantageous one for manufacturing the thin film heads, the value Hk of a magnetic layer increases as the thickness of the layer increases. FIG. 4 is a graph of the field of anisotropy of a thin layer plotted against its thickness, measured in microns. When the layer is made of permalloy. Up to about 0.5 micron, the value of Hk is substantially constant and does not exceed 2 oersteds by more than a very slight amount. Moreover, a reasonable estimation of the field value in such a zone as — is about $3 \times 10^{11}$ maxwells per centimeter in the transverse direction, i.e. in a direction perpendicular to the plane of the drawing. This figure may as well be stated as being 3,000 $\mu \times G$ according to a usual formulation in the technique of magnetic tapes. A permalloy layer having a thickness of the order of 0.5 micron may easily draw a flux of the order of $5.10^{11}$ maxwells/cm of the above said direction. Layer 4 may be about 0.5 micron for purposes of the invention.

In order that the layer 4 can function as required, it is further necessary that it be magnetically isolated because, in thin film structures, it is very close to the winding. Considering, for instance, a thickness of 6 microns for each pole piece and an intermediate layer 5 of the order of 0.8 to 1 micron, or slightly higher than 1 micron, the layer 4 will be spaced by 7 or 8 microns from the winding 3. The writing current in the winding may disturb the magnetic layer 4, i.e. modify the orientation of its magnetization and consequently modify the permeability of the layer at the frequency of variation of the current. A magnetic shield is therefore inserted between the pole piece 2 and the layer 4.

Such a shielding layer could be inserted within the layer 5. It will however consist of a thin anisotropic layer of a high permeability material. Consequently it is preferable to provide a "stack" of these shield and magnetic flux diverting layers over the concerned pole piece, and FIG. 5 shows one example of such a stack. Over the lateral face of the pole piece 2 are alternately formed non-magnetic spacing layers $5^1, 5^2, \ldots 5^5$ and high permeability thinner layers $4^1, 4^2 \ldots 4^5$. More than five layers of each material may be provided. The material of the non-magnetic spacing layers 5 can be for example SiO, $SiO_2$, Cr and similar materials. Each layer 5 may have a thickness substantially equal to 1 micron and each layer 4 may be of about 1000 Angstroms thick. Each layer 4 consequently is of a low value of field of anisotropy, see FIG. 4. The overall "thickness" of the layers 4, obtained by adding their individual thicknesses should not exceed 0.5 micron.

Broadly stated, such a stack acts from the introduction of each successive high permeability layer as first, a shield layer and thereafter a magnetic flux diverting layer and, the operation may be explained as follows:

For this explanation, it will be assumed that the driving field which is generated by the winding uniformly increases with respect to the time. In actual practice, of course, this field will vary according to the needs of the record. When the driving field is low, the magnetization of the layer $4^1$ is not disturbed and said layer plays the part of a high permeability layer ensuring the diversion of the magnetic flux, as it is not saturated. The other layers of the stack play no part in such a condition. When the driving field increases, the magnetization of the layer $4^1$ is disturbed but is more active in the diversion of the flux so that said field is quite reduced at the level of the layer $4^2$ in the stack. When the driving field still increases, the layer $4^1$ is saturated, the layer $4^2$ is only partially saturated, and it is the layer $4^3$ which mainly acts for diverting the magnetic flux; and so forth as the value of the field generated by the writing current in the winding 3 continues to increase. Each magnetic layer 4 thus plays two parts and acts as a magnetic shield when saturated and a flux diverting layer when not or only partially saturated. The magnetic conditions of the layers are continuously varying, without any discontinuity and, for an actual variation of a signal within the winding 3, these magnetic conditions follow the variation of the signal.

It is of course not imperative that all the layers 4, or all the layers 5, be of identical thicknesses throughout.

Obviously, when useful, the additional layers which have been herein above described may be added on both sides of the "elementary" head structure comprising the pole pieces 1–2 and the winding 3. Such an arrangement is schematically indicated at 40 in FIG. 3.

What is claimed is:

1. A thin film magnetic writing head having a frontal air gap face for recording information on a magnetic medium moving adjacent and parallel to said frontal face comprising:
   a laminated magnetic flux generating structure including a pair of spaced thin film magnetic pole piece layers having inner and outer faces and end portions defining an air gap there between in said frontal face;
   an electrical winding magnetically coupled to and positioned between said pole piece layers;
   at least one thin film high permeability magnetic layer having a thickness corresponding to the lowest possible value of its field of anisotropy, overlying, parallel to and spaced from one of said pole pieces; and
   a layer of non-magnetic material positioned between said high permeability layer and said one pole piece, said layer being of a thickness insuring magnetic decoupling between said thin film high permeability magnetic layer and said one pole piece, said one pole piece being the one downstream in the direction of movement of the magnetic medium.

2. The combination as defined by claim 1 in which each of said pole piece layers is of the order of 5 microns thick, said thin film high permeability layer is of the order of 0.5 microns thick and said non-magnetic layer is of the order of 1 micron thick.

3. The combination defined by claim 1 in which there are a plurality of said thin film high permeability magnetic layers, the sum of the thicknesses of which do not exceed a thickness of the order of 0.5 microns, each of said layers being spaced from its adjacent layer by a non-magnetic decoupling layer of the order of 1.0 microns in thickness.

4. The combination defined by claim 1 in which the material of said non-magnetic layer is electrically insulating.

5. A thin film magnetic writing head having a frontal air gap face for recording information on a magnetic medium moving adjacent and parallel to said frontal face comprising:
   a laminated magnetic flux generating structure including a pair of spaced thin film magnetic pole piece layers having inner and outer faces and end portions defining an air gap therebetween in said frontal face;
   an electrical winding magnetically coupled to and positioned between said pole piece layers;
   at least two thin film high permeability magnetic layers having a thickness corresponding to the lowest possible value of its field of anisotropy, one overlying, parallel to and spaced from each of said pole pieces respectively; and
   at least two layers of non magnetic material, one positioned between each said high permeability layer and its respective pole piece, said non-magnetic material layers being of a thickness insuring magnetic decoupling between said thin film high permeability magnetic layers and said pole pieces.

6. A thin film magnetic head to record information on a magnetic recording medium moving transversly in front of a magnetic gap of the head, comprising in combination:
   a pair of magnetic thin film pole piece members;
   read/write conductor means inductively coupled to said pole piece members and passing there between to define said magnetic gap, each of said pole piece members having a lateral face oriented perpendicularly to said recording medium and remote from said conductor means:
   a stack of alternating thin film magnetic and non-magnetic materials positioned to contact and overlie the downstream lateral face of that one of said pole piece members which is downstream of the direction of movement of the recording medium, a non-magnetic film of said stack positioned next to said pole piece and of a thickness to insure magnetic decoupling of the stack from the pole piece;
   the total thickness of the magnetic layers in said stack not exceeding a value corresponding to that at which the anisotropy field of the magnetic material is the lowest.

7. A magnetic head according to claim 6, in which the non-magnetic layers of said stack are formed of electrical insulating material substantially thicker than the magnetic layers of said stack.

8. A magnetic head according to claim 6 in which the magnetic material is permalloy, the sum of the thicknesses of the magnetic layers is not higher than a thickness of the order of 0.5 microns, the non-magnetic layers are electrically insulating material and each of the order of 0.8 to 1.0 microns thick.

* * * * *